Sept. 13, 1966 R. G. RUDNESS ET AL 3,272,591
PRODUCTION OF SINGLE CRYSTALS FROM INCONGRUENTLY
MELTING MATERIAL
Filed May 8, 1959

INVENTORS
ROBERT G. RUDNESS
RICHARD W. KEBLER

BY William L. Mesinger
ATTORNEY

United States Patent Office 3,272,591
Patented Sept. 13, 1966

3,272,591
PRODUCTION OF SINGLE CRYSTALS FROM INCONGRUENTLY MELTING MATERIAL
Robert G. Rudness and Richard W. Kebler, Indianapolis, Ind., assignors to Union Carbide Corporation, a corporation of New York
Filed May 8, 1959, Ser. No. 811,905
4 Claims. (Cl. 23—50)

This invention relates to an improved process for the growth of large single crystals of incongruently melting material along an axis of growth, as for example, growth of large unicrystalline phases of yttrium iron garnet from incongruently melting yttrium iron garnet feed material.

Because of their extremely narrow magnetic resonance line width, large unicrystalline portions of incongruently melting material are useful in the electronics industry for devices such as parametric amplifiers. For example, unicrystalline masses of yttrium iron garnet have a magnetic resonance line width of about 20 oersteds or less.

U.S. Patent No. 1,004,505 to Verneuil discloses a process for growing crystals by passing feed material through a flame followed by fusing and accumulating the resulting melting material by crystallization on a suitable support axially aligned below the flame. The support and the flame are gradually moved apart to progressively accumulate the fused feed material and form an axially lengthening crystal on the support. This so-called flame fusion or Verneuil process has been used successfully to grow large unicrystalline phases of congruently melting materials such as sapphire and rutile. Such congruently melting materials have a substantially constant melt point for each material and do not undergo composition changes when passing between the liquid and solid states.

The Verneuil process has previously been used to a very limited extent for the production of unicrystalline phases of incongruently melting material which has a melting point range and which undergoes composition changes when passing between the liquid and solid states. For example mullite, an incongruently melting compound of aluminum and silicon oxides, has been grown in single crystal form by the Verneuil process, as described in J. Am. Cer. Soc., volume 33, pages 140–143. The technique used, however, is not applicable for the growth of other incongruently melting compounds, such as yttrium iron garnet having the formula $3Y_2O_3 5Fe_2O_3$, since it involves a high temperature gradient wherein the mullite does not behave like an incongruently melting compound. It is believed the high viscosity of the melt when growing mullite enables one to supercool the liquid below the peritectic temperature so that solid mullite precipitates from a mullite melt. The composition of the liquid and solid during growth are essentially the same, in contrast to the conventional crystallization mechanism of incongruent materials.

An object of the present invention is to provide an improved process for growing unicrystalline masses from incongruently melting materials.

Another object is to provide an improved process for growing unicrystalline masses of yttrium iron garnet from incongruently melting yttrium iron garnet feed material.

Other objects will become apparent from the ensuing disclosure and appended claims.

The present invention is predicated on the discovery that if the incongruent feed material is melted and then cooled in a manner such that the linear growth rate of the crystalline mass is maintained below a defined limiting value, large unicrystalline phases may be grown. More specifically, a large single crystal product of incongruently melting material may be grown along an axis of growth by providing feed material, and a heating zone in thermal association with the feed material. The heating zone and the feed material are progressively contacted so as to consecutively fuse, cool and accumulate the incongruently melting material by crystallization. This progressive contact along the axis of crystallization growth is at a sufficiently low rate to maintain the liquidus composition at the growing surface at a value between the eutectic mixture and the initial product solidification mixture. As used herein, the expression "initial product solidification mixture" refers to the liquidus composition from which the desired unicrystalline product phase first begins solidifying, as the liquidus is further cooled.

When growing unicrystalline masses of yttrium iron garnet by the instant process, it has been found that the linear growth rate of the solidifying mass must be maintained below about 0.2 inch per hour, as measured along the axis of growth. In a preferred embodiment of the present invention, the linear growth rate for unicrystalline masses of yttrium iron garnet is maintained at about 0.10 inch per hour, also measured along the axis of growth.

Although the invention will be described specifically in terms of growing unicrystalline masses for yttrium iron garnet, it is to be understood that the present process is admirably suited for growth of unicrystalline masses from other incongruently melting materials such as $Ba_4Ti_4O_9$, $MnO.TiO_2$, $5PbO.CrO_3$, $ZrTiO_4$, $2MnO.SiO_2$, $3CaO.Fe_2O_3$, and the like. In growing single crystals from any of these materials in accordance with the present invention, the linear growth rate must be low enough to maintain the composition of the liquidus at the growing surface at a value between the eutectic mixture and the "initial product solidification mixture."

Figure 1:
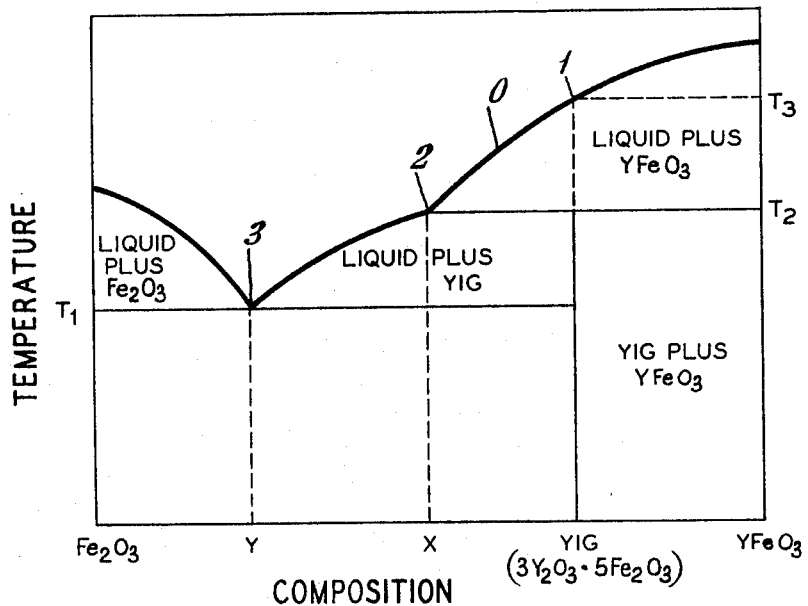
FIG. 1 is a phase diagram of the $Y_2O_3$–$Fe_2O_3$ system, and will be used to describe and illustrate the growth of large unicrystalline yttrium iron garnet phases by the process of the present invention.

Referring now more specifically to FIG. 1, yttrium iron garnet feed material melts incongruently at temperature $T_2$ (about 1580° C.) to form liquid plus solid $YFeO_3$ (yttrium orthoferrite). As additional heat is supplied to the two-phase system, an increasing amount of the solid $YFeO_3$ becomes liquid. For example, at a temperature between $T_2$ and $T_3$, the composition of the liquid may be determined by drawing a horizontal line from the temperature ordinate to the left until it intersects the liquidus line 10. When temperature $T_3$ (about 1680° C.) is reached, substantially all of the yttrium iron garnet feed material has melted and is in the molten liquid state with a composition indicated by point 11 on the liquidus line.

On cooling a given mass of molten yttrium iron garnet from a temperature above $T_3$ with no material being added during solidification, the sequence of crystallization is as follows: When temperature $T_3$ is reached, $YFeO_3$ (yttrium orthoferrite) begins to crystallize randomly throughout the melt and continues to crystallize until temperature $T_2$ is reached. While the $YFeO_3$ is crystallizing, the remaining liquid changes in composition along the liquidus line 10 to become richer in $Fe_2O_3$. At temperature $T_2$ and point 12 along the liquidus line 10, the mass of original material consists of solid $YFeO_3$ particles and liquid of composition X, or about $$3Y_2O_3.8Fe_2O_3$$

(65.5 wt. percent $Fe_2O_3$). The portion of the phase diagram above temperature $T_2$ and to the right of point 12 is known as 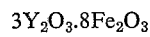 the incongruently melting zone.

Point 12 is the liquidus composition from which the yttrium iron garnet particles first begin to solidify randomly during cooling. As the system is further cooled from $T_2$ towards $T_1$ (about 1440° C.), yttrium iron garnet particles randomly crystallize continuously until reaching $T_1$, the temperature at which the eutectic mixture is formed. During this cooling stage, the liquid changes continuously in composition to become further enriched in $Fe_2O_3$, and its composition moves from the initial product solidification mixture X to eutectic composition Y found at point 13 on the liquidus line. At this point the mass of original material consists of $YFeO_3$ particles, yttrium iron garnet particles whose composition is marked "YIG" in FIG. 1, and liquid of the eutectic composition Y which is about $2Y_2O_3.11Fe_2O_3$ (79.5 wt. percent $Fe_2O_3$). On still further cooling, the remaining liquid solidifies isothermally to form a eutectic structure of yttrium iron garnet and $Fe_2O_3$.

When crystals of yttrium iron garnet are grown at relatively high linear rates above about 0.2 inch per hour by the Verneuil method, as suggested by the prior art, the product boule becomes substantially uniformly three-phase containing intermixed yttrium iron garnet, $YFeO_3$, and $Fe_2O_3$ following the procedural theory previously described. At relatively high linear rates, solidification occurs at the bottom of the liquid melt at a rapid rate. Since the initial melt has the overall composition of the feed material, each small increment that solidifies has the overall yttrium iron garnet composition. As this small increment begins to solidify, the remaining liquid in the increment changes in composition. At a higher linear growth rate, solidification occurs so rapidly that the liquid remaining in a given increment at the base of the melt does not have sufficient time to intermingle or mix with the yttrium iron garnet composition liquid above it. As a result, solidification occurs from a liquid whose composition is almost continually changing until solidification of that increment is complete. The composition of the melt increment that is solidifying can thus vary from values above the initial product solidification point 12 to the eutectic point 13 on the liquidus line 10 and cause solidification of yttrium iron garnet intermixed with solidified $Fe_2O_3$ and $YFeO_3$. The composition of the remaining melt always remains at the yttrium iron garnet composition especially since yttrium iron garnet feed material is added to the top of the melt.

It was unexpectedly found that when relatively slow linear growth rates below about 0.2 inch per hour and preferably about 0.10 inch per hour are employed, large unicrystalline phases of incongruently melting materials can be readily grown. The following mechanism is believed to occur when unicrystalline phases of yttrium iron garnet are grown according to the present invention: At the beginning of growth, initial crystallization occurs from a melt having a composition of yttrium iron garnet ($3Y_2O_3.5Fe_2O_3$). Primary $YFeO_3$ crystallizes while yttrium iron garnet composition feed material is being added to the molten cap. As solid $YFeO_3$ forms, the overall composition of the molten cap moves to the left along the liquidus line 10 towards point 12, the initial product solidification composition, thus becoming enriched in $Fe_2O_3$. When the molten cap composition reaches X, the unicrystalline yttrium iron garnet phase begins to crystallize. At this point in the process, the growth conditions are maintained relatively constant and the linear growth rate is kept below about 0.2 inch per hour so as to achieve a quasi-steady state condition. Yttrium iron garnet feed material is introduced into the molten cap from above and yttrium iron garnet crystallizes at the solid-liquid interface. The liquid thus essentially serves as a vehicle for the yttrium iron garnet phase.

Close examination of the liquid composition during this steady state growth indicates that it is not completely uniform throughout. However it is much more uniform than the corresponding liquid obtained under relatively fast growth conditions. A slight concentration gradient exists through the thickness of the molten cap because of the deposition of yttrium iron garnet feed material on the surface of the molten cap and the depletion of the $Y_2O_3$ content in the liquid adjacent to the growing crystal face, due to yttrium iron garnet crystallization. Slow growth at a linear rate below 0.2 inch per hour minimizes the concentration gradient because the melting yttrium iron garnet feed material has sufficient time for diffusion through the molten cap to the liquid-solid interface. Consequently the melt has greater opportunity to approach uniformity of composition, and relatively large unicrystalline phases may be grown in a series of small increments at the bottom of the melt from liquid having a composition between that of the initial yttrium iron garnet product solidification mixture X and eutectic mixture Y. Only pure yttrium iron garnet can be solidified from a liquid in this composition range, and massive unicrystalline yttrium iron garnet can thus be continuously produced under these conditions. When a product mass of desired size is obtained, the addition of feed material is terminated and the molten boule cap is allowed to cool. This final portion of the boule will thus solidify from a melt having a composition which reaches the eutectic point and will consist primarily of a $Fe_2O_3$-yttrium iron garnet eutectic structure.

The previously described theory was reasonably confirmed by an experiment in which growth of yttrium iron garnet was initiated at a low linear rate of about 0.1 inch per hour. During this period a large unicrystalline yttrium iron garnet mass was formed. A sudden rapid increase in the linear growth rate would be expected to deposit yttrium iron garnet so rapidly from the melt that the liquidus composition at the bottom of the melt would be shifted to the eutectic composition at point 13. Accordingly, this was done and a two-phase solid consisting of yttrium iron garnet and $Fe_2O_3$ began to deposit.

By the process of the present invention, unicrystalline masses of yttrium iron garnet may be grown from incongruently melting garnet feed material by allowing $YFeO_3$ to solidify first in a controlled amount so that the remaining liquid becomes enriched in $Fe_2O_3$ to an overall composition near X, the initial product solidification mixture. The unicrystalline yttrium iron garnet phase is then grown at a rate below about 0.2 inch per hour and preferably about 0.10 inch per hour, to allow formation of the proper concentration gradient in the molten cap. This gradient comprises maintaining the liquid at the top of the molten cap at a composition near that of the desired yttrium iron garnet and the liquid at the crystal growing face at a composition between X, the initial product solidification mixture, and Y, the eutectic mixture.

The product boule consists of a relatively small $YFeO_3$-rich section at the base and a relatively small $Fe_2O_3$-rich section at the top. The remaining bulk of the boule in between these end sections consists of one or more large unicrystalline portions of yttrium iron garnet. The presence of these end sections and separate crystalline phases is readily detected by examining a cross-section of the boule, and the end sections may be conveniently severed from the boule if desired. When the boule is to be used in parametric amplifiers, the end sections are cut off so that only the unicrystalline section remains.

Figure 2:
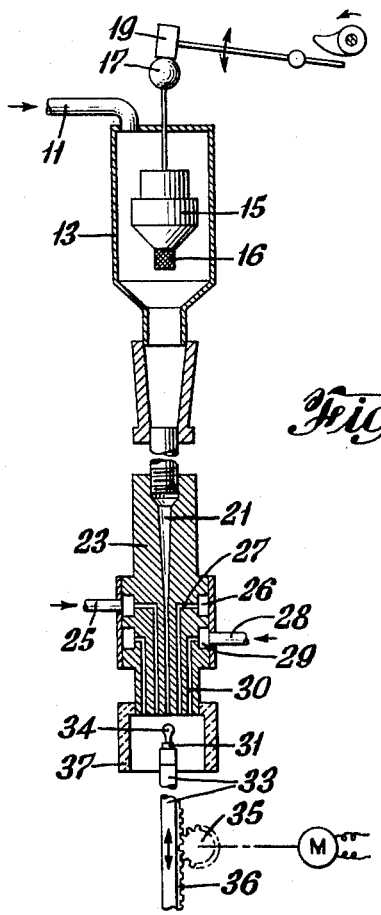
FIG. 2 is a schematic vertical sectional view, parts being in elevation, of one form of apparatus for performing the process of the invention.

Although the present process may be performed using several types of apparatus well-known by those skilled in the crystal growing art, it has been found that the Verneuil-type apparatus illustrated in FIG. 2 is particularly suitable for growth of large unicrystalline phases of yttrium iron garnet from incongruently melting feed material. Referring now more specifically to FIG. 2, a suitable carrier gas such as oxygen is supplied through a conduit or pipe 11 to the interior of a dispenser 13 having therein a container for fed material, preferably in the powder form. Container 15 has a sieve 16 connected to its lower end, and the powdered incongruently melting material such as yttrium iron garnet is sifted from the container 15 by intermittently striking an anvil 17 with a hammer 19. The downwardly falling feed material is conducted by the oxygen carrier gas into the central passage 21 of a vertical burner 23 from which it is delivered downwardly as a stream of restricted cross-section containing a controlled quantity of particles of the feed material.

Combustible fuel gas such as hydrogen is supplied to the burner 23 through a conduit or pipe 25 opening into an annular distributing chamber 26. From the chamber 26, the fuel gas passes to the lower end of the burner through a plurality of passages 27 surrounding the central passage 21. An oxidant such as oxygen gas is supplied to the burner 23 through a conduit or pipe 28 opening into a second annular distributing chamber 29. From the chamber 29, the oxygen passes to the lower end of the burner 23 through a plurality of passages 30 surrounding fuel gas passages 27. The oxygen and hydrogen mix together outside the burner and upon ignition, the resulting flame heats to a high temperature and melts the powdered fed material, which fuses and accumulates upon the top of a ceramic pedestal 31. Ceramic pedestal 31 is carried by vertical support 33, and the resulting flame pedestal 31 and support 33 are aligned along the same vertical axis.

As the resulting crystalline boule 34 increases in length, it is gradually moved and withdrawn downwardly away from the burner 23 as the fused melt is deposited thereon by a pinion gear 35 cooperating with a rack 36 on the side of the support 33. The pinion 35 may be actuated either manually or by a suitable mechanical drive, such as an electric motor. The upper end of the growing boule may be kept within a small cylindrical heat-confining casing or furnace 37, of heat-resistant metal or ceramic material, which is sleeved over the lower end of the burner 23.

It can thus be seen that the FIG. 2 apparatus provides means for controlling the linear growth rate to any desired value. That is, the growth rate may be readily controlled either by the rate of feed material introduction through passage 21, or the rate at which the flame and pedestal 31 are drawn apart. It has been found, however, that the unicrystalline linear growth rate is most effectively controlled by utilizing both of these techniques simultaneously.

Although Verneuil-type apparatus suitable for carrying out the invention has been illustrated in FIG. 2 and described in detail, other flame fusion type apparatus well-known to those skilled in the art is equally adaptable for use with this invention. For example it may be performed by means of the "floating zone" technique, and a sintered rod of yttrium iron garnet could be used therein with the establishment of a localized heating zone at the base of the rod. Such localized heating may be provided, for example, by means of a ring burner or an induction coil. The zone of localized heating would be moved upwardly in the longitudinal direction and along the sintered rod at a rate of less than about 0.2 inch per hour. The sequence of melting and solidification which is effected across the zone of localized heating is the same as that which occurs in the molten boule cap of the previously described Verneuil adaptation of the invention. Alternatively, if a suitable crucible is employed, yttrium iron powder could be melted and solidified in a similar manner. A crucible constructed, for example, of thin-walled alumina with a thin-walled platinum liner may be filled with yttrium iron garnet powder, and a zone of localized heating could then be passed along the longitudinal axis of the crucible to form a product having a YFeO$_3$-rich zone at one end, a Fe$_2$O$_3$-yttrium iron garnet zone at the other end, and substantially unicrystalline yttrium iron garnet therebetween. The floating zone technique has the advantages of improved control over thermal conditions at the growth zone and improved control over size of boule diameter.

As a further modification to these alternate techniques, the zone of localized heating may be stationary and the sintered rod or crucible may be passed through this zone.

The remarkable advantages of the present invention were clearly illustrated in the following successfully conducted experiment: Apparatus similar to that illustrated in FIG. 2 was used to grow large unicrystalline phases of yttrium iron garnet. The heat source for the flame fusion of yttrium iron garnet feed material consisted of a hydrogen-oxygen burner having a 1.15 c.f.h. oxygen stream surrounded by a 3.15 c.f.h. hydrogen stream. The latter was in turn surrounded by a 0.89 c.f.h. oxygen stream. Finely divided (through 400 mesh screen) yttrium iron garnet powder was fed through the inner oxygen stream at about 0.3 gram per hour, heated and fused by the combustion flame, and deposited on a ceramic support where it solidified. The support was lowered at 0.10 inch per hour to form a product boule $\frac{3}{16}$ inch long and 1 inch long containing a large unicrystalline phase of yttrium iron garnet.

Crystals grown in a similar manner by the present process have been found to have a magnetic resonance line width of about 20 oersteds or less. This characteristic indicates their utility in parametric amplifiers. It is to be understood that minor amounts of other materials could be added to the yttrium iron garnet grown in the previously described manner so as to vary its magnetic line width, without departing from the present invention.

Although preferred embodiments of the invention have been described in detail, it is contemplated that modifications of the process may be made, and that some features may be employed without others, all within the spirit and scope of the invention.

What is claimed is:

1. A process for growing a boule containing a unicrystalline section of yttrium iron garnet (3Y$_2$O$_3$·5Fe$_2$O$_3$) comprising (1) preparing a supply of yttrium iron garnet feed material, (2) passing the yttrium iron garnet feed material through a heated zone which is coaxial to an accumulation support, (3) heating said yttrium iron garnet feed material to establish a liquidus composition, (4) maintaining the liquidus composition between the eutectic and peritectic points on an equilibrium phase diagram of YFeO$_3$ and Fe$_2$O$_3$ and at a temperature from about 1440° C. to about 1580° C. while accumulating yttrium iron garnet crystal on said support from the liquidus composition, (5) gradually providing relative motion between said support and heated zone and (6) recovering a boule containing a unicrystalline section of yttrium iron garnet.

2. In a process for growing large unicrystalline yttrium iron garnet phases from incongruently melting yttrium iron garnet feed material having the composition of $$3Y_2O_3 \cdot 5Fe_2O_3$$

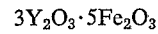

along an axis of growth by passing such feed material through a flame and fusing and accumulating the material on a suitable support aligned axially with said flame while gradually moving said flame and support apart to progressively solidify such feed material and form an axially lengthening crystal on said support, the improvement which comprises as a first step, passing said feed material through said flame to form a molten boule cap on said support and axially moving said flame and said support apart so that the lower portion of said molten boule cap cools to the temperature at which yttrium orthoferrite begins to solidify on said support, such solidification causing the liquidus in the molten cap to have a progressively increasing concentration of ferric oxide near the crystal growing surface at the base of the molten cap; said first step being continued until the temperature and liquidus composition at said crystal growing surface are such that the solidification of said yttrium orthoferrite terminates and unicrystalline yttrium iron garnet begins to solidify; as a second succeeding step, passing said feed material through said flame and axially moving said flame and said support apart to maintain the liquidus composition at a temperature between about 1440° C. and about 1580° C. and at a composition of from about 65.5 weight percent to about 79.5 weight percent Fe₂O₃ to continue the accumulation of said unicrystalline yttrium iron garnet at the crystal growing surface until a product boule of desired size is obtained.

3. In a process for growing large unicrystalline yttrium iron garnet phases from incongruently melting yttrium iron garnet feed material having the composition of $$3Y_2O_3 \cdot 5Fe_2O_3$$

along an axis of growth by passing such feed material through a flame and fusing and accumulating the material on a suitable support aligned axially with said flame while gradually moving said flame and support apart to progressively solidify such feed material and form an axially lengthening crystal on said support, the improvement which comprises as a first step, passing said feed material through said flame to form a molten boule cap on said support and axially moving said flame and said support apart so that the lower portion of said molten boule cap cools to the temperature at which yttrium orthoferrite begins to solidify on said support, such solidification causing the liquidus in the molten cap to have a progressively increasing concentration of ferric oxide near the crystal growing surface at the base of the molten cap, said first step being continued until the temperature and liquidus composition at said crystal growing surface are such that the solidification of said yttrium orthoferrite terminates and unicrystalline yttrium iron garnet begins to solidify; as a second succeeding step, passing said feed material through said flame and axially moving said flame and said support apart to maintain the liquidus composition at a temperature between about 1400° C. and about 1580° C. and at a composition of from about 65.5 weight percent to about 79.5 weight percent Fe₂O₃ to continue the accumulation of said unicrystalline yttrium iron garnet at the crystal growing surface at a linear growth rate below about 0.20 inch per hour until a product boule of desired size is obtained.

4. A process according to claim 3 for growing large unicrystalline yttrium iron garnet phases, in which the unicrystalline yttrium iron garnet growth rate is about 0.10 inch per hour.

References Cited by the Examiner

UNITED STATES PATENTS

| | | | |
|---|---|---|---|
| 2,122,180 | 6/1938 | Lederle et al. | 106—36.1 |
| 2,723,916 | 11/1955 | Merker | 106—42 |
| 2,764,490 | 9/1956 | Merker | 23—51 XR |
| 2,792,287 | 5/1957 | Moore et al. | 23—202 |
| 2,850,355 | 9/1958 | Linz et al. | 23—51 |
| 2,860,998 | 11/1958 | Merker | 23—51 XR |
| 2,936,216 | 5/1960 | Merker | 23—51 |
| 2,942,941 | 6/1960 | Merker | 23—51 |
| 2,957,827 | 10/1960 | Nielsen | 23—51 X |
| 2,992,931 | 7/1961 | Merker | 23—51 X |

OTHER REFERENCES

Barbier et al.: article in "Comptes Rendus" v. 242, pp. 2531-3 (1956).

Bauer et al.: Journal of the American Ceramic Society, vol. 33, No. 4, April 1950, pp. 140–143.

Bertaut et al.: article in "Comptes Rendus" v. 243, pp. 898–901 (1956).

Pauthenet: article in "Comptes Rendus" v. 243, pp. 1737–40 (1956).

OSCAR R. VERTIZ, *Primary Examiner.*

MAURICE A. BRINDISI, BENJAMIN HENKIN,
*Examiners.*

A. J. STEWART, J. O. THOMAS, A. J. ADAMICK, H. T. CARTER, *Assistant Examiners.*